Figure 1:
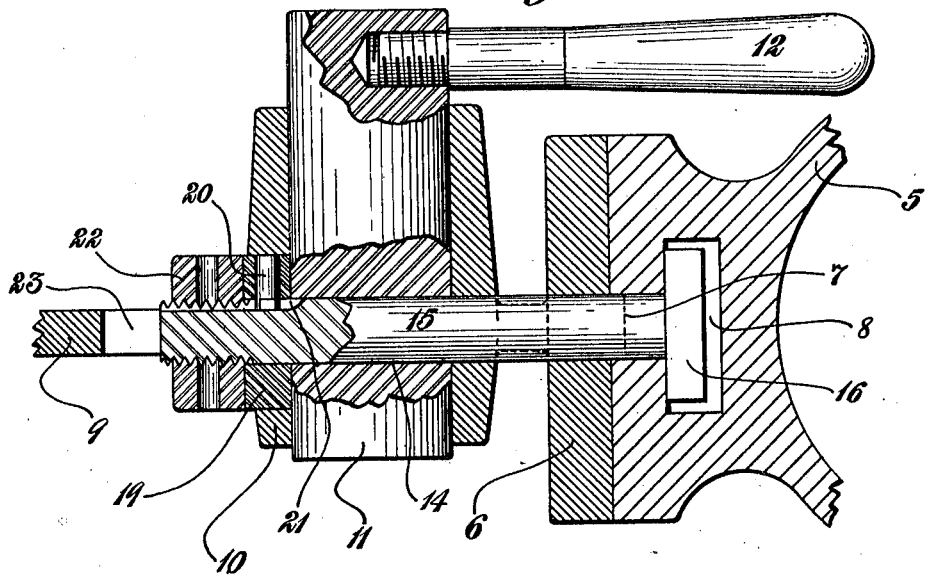

W. J. BAYRER.
CLAMPING DEVICE.
APPLICATION FILED AUG. 14, 1911.

1,035,143.

Patented Aug. 13, 1912.

Witnesses:

Inventor:
William J. Bayrer

UNITED STATES PATENT OFFICE.

WILLIAM J. BAYRER, OF HARTFORD, CONNECTICUT, ASSIGNOR TO THE HENRY & WRIGHT MANUFACTURING COMPANY, OF HARTFORD, CONNECTICUT, A CORPORATION OF CONNECTICUT.

CLAMPING DEVICE.

1,035,143.  Specification of Letters Patent.  Patented Aug. 13, 1912.

Application filed August 14, 1911. Serial No. 643,972.

*To all whom it may concern:*

Be it known that I, WILLIAM J. BAYRER, a citizen of the United States, residing at Hartford, in the county of Hartford and State of Connecticut, have invented certain new and useful Improvements in Clamping Devices, of which the following is a specification.

This invention relates to clamping devices, the object of the invention being to provide a simple article of this character which can be readily and inexpensively made and by which an adjustable part can be solidly and substantially set in an adjusted position.

The device can be used with advantage in many different connections, for instance in conjunction with or as part of a metal working machine such as a drill press.

In the drawings accompanying and forming part of the present specification I have shown fully one convenient form of embodiment of the invention which to enable those skilled in the art to practise the same will be set forth in detail in the following description, while the novelty of the invention will be included in the claims succeeding said description. From this statement it will be clear that I do not restrict myself to such showing; I may depart therefrom in several respects within the scope of the invention included in the claims succeeding said description.

Figure 2:
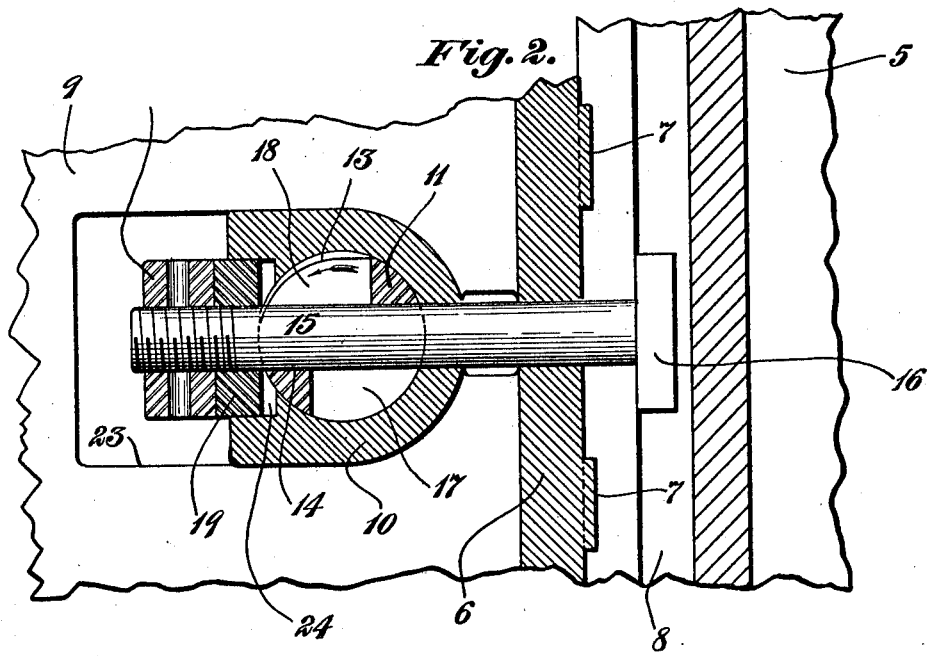

Referring to said drawings: Figure 1 is a horizontal section of a clamping device involving my invention, and, Fig. 2 is a vertical section of the same.

Like characters refer to like parts in both views.

In the drawings I have shown a support as 5 and a tool carrying member 6 of a metal working machine which for sake of illustration will be assumed to be the pillar and spindle-carrying arm of a drill press. This arm 6 is adjustable vertically along the pillar or column 5 and in a drill press it is provided with a spindle (not shown). The arm 6 can be connected to the pillar 5 in any of the well-known ways, for instance it may be furnished with a tongue or tongues as 7 adapted to slide in a T-slot 8 in the face of the pillar.

The web 9 of the arm 6 is shown provided with a hub or sleeve 10 usually but not necessarily made integral therewith, and in this hub is mounted for turning movement the rotary operating member 11, one extended end of which is provided with suitable operating means therefor such as the hand lever 12, the threaded shank of which may as shown, be tapped into said extended end. The said rotary member 11 is shown provided with a circumferential cam portion 13 between the ends thereof, the purpose of which will be hereinafter explained. Except for said cam portion the member 11 is practically cylindrical and said cam portion can be easily formed by milling away a part of the periphery of a cylindrical body. The rotary cam member 11 has a transverse opening 14 which can be easily formed by boring and which is adapted for the passage of the stud 15 which may as illustrated consist of a bolt having a head 16 at its inner end fitted in the T-slot 8 to which reference has already been made, the arm 6 also having an opening for the passage of said stud or bolt 15.

The rotary cam member 11 in addition to the opening 14 has the approximately diametrically opposite slots 17 and 18 which are elongated transversely of the part 11 and which open into or intersect the hole 14, by reason of which the said cam member 11 can be readily turned into clamping or releasing relation with the stud 15. Said cam member 11, therefore, has a passage entirely therethrough, and although said passage is of different widths, this is not essential, the material feature comprising a stud or equivalent part which extends through said cam member or analogous part by way of a passage such as has been described or another one of suitable kind.

The stud 15 is provided with a stop or abutment which may as shown consist of a washer 19 which is prevented from turning on said stud by a key or pin 20 carried by the washer and adapted to enter the longitudinally extending keyway 21 in the outer end of the stud, said washer being backed up by the nut 22 threaded onto said stud or bolt 15. The web 9 has a slot 23 to provide for the ready connection of the washer 19 and nut 22 with the stud the latter extending into said slot, the washer 19 when in operative position being generally disposed in a counterbore 24 formed in the hub 10. The cam portion 13 coöperates with the washer 19 to set or release the clamping head 16, said washer being held in an adjusted position by the nut 22. This nut also compensates for wear between the washer 19 and said cam portion, which as will be understood is situated at opposite sides of the opening or hole 14.

In Fig. 2 the high part of the cam face or portion 13 is against the washer 19 so as to thereby press the clamping head 16 solidly and substantially against the forward wall of the T-slot 8 and consequently maintain the arm 6 in an adjusted position. To change the adjustment the arm 12 will be grasped and swung forward to move the rotary cam member 11 in the direction of the arrow in Fig. 2 and bring the low part of the cam opposite the coöperating surface of the washer 19 to free the head 16 from clamping relation with the pillar 5 so that the arm 6 can be raised or lowered. When the adjustment has been secured, the arm 12 will be swung back so as to cause the cam portion 13 to ride along the adjacent surface of the washer 19 and thereby thrust the stud or bolt 15 forward and also cause the head 16 to bind against the forward wall of the T-slot 8. I have set forth one way in which the parts 11 and 15 coöperate to clamp the arm or similar member 6; there are other ways in the scope of my invention as covered by my claims by which this function can be obtained.

What I claim is:

1. A clamping device comprising a rotary cam member having a transverse opening therethrough and also having approximately diametrically opposite slots intersecting said opening, and a stud extending through said opening, provided with a clamping head, and operable by said cam member.

2. The combination of a support, a member adjustable on said support, a cam member and a stud coöperative to hold the adjustable member in an adjusted position, said stud extending through the cam member and the latter being turnable to set or release said adjustable member.

3. A clamping device comprising a rotary cam member having an opening therethrough and also having approximately diametrically opposite slots elongated in the transverse direction of said member and intersecting said opening, a stud extending through said opening provided with an adjustable washer engageable by the cam portion of said cam member and also provided with a clamping head.

4. A clamping device comprising a rotary cam member having an opening therethrough and also having approximately diametrically opposite slots elongated in the transverse direction of said rotary member and intersecting said opening, a stud extending through said opening provided with a clamping head, a washer on the stud and engageable by the cam portion of said cam member, and a nut threaded onto the stud and fitted against said washer.

5. The combination of a support, a member adjustable on said support, a rotary cam member carried by said adjustable member, a stud provided with a clamping head for engaging the support, said cam member having an opening for the passage of said stud, a washer and a nut fitted on said stud, the washer being engageable by the cam portion of said cam member and the adjustable support having a slot to provide for the connection of said washer and nut with said stud.

6. The combination of a support, a member adjustable on said support, a rotary cam member and a stud coöperative to hold the adjustable member in an adjusted position, the cam member having an opening for the stud and also having substantially diametrically opposite slots intersecting said opening and elongated in the transverse direction of said cam member.

In testimony whereof I affix my signature in presence of two witnesses.

WILLIAM J. BAYRER.

Witnesses:
  HEATH SUTHERLAND,
  JAMES O'BRIEN.

---

Copies of this patent may be obtained for five cents each, by addressing the "Commissioner of Patents, Washington, D. C."